United States Patent
Rufle et al.

[11] 3,767,296
[45] Oct. 23, 1973

[54] APPARATUS FOR MAKING ANIMATED MOTION PICTURES OR THE LIKE

[76] Inventors: George H. Rufle; George G. Rufle, both of Laurelton, N.Y.

[22] Filed: Nov. 24, 1971

[21] Appl. No.: 201,752

[52] U.S. Cl............ 352/87, 352/5, 352/23, 352/50
[51] Int. Cl. ........................... G03b 21/32
[58] Field of Search .............. 352/5, 12, 15, 16, 352/17, 19, 20, 23, 24, 31, 39, 50, 51, 52, 87

[56] References Cited
UNITED STATES PATENTS
1,631,450  6/1927  Andrews................ 352/23
1,941,341  12/1933  Disney et al. ............ 352/5

FOREIGN PATENTS OR APPLICATIONS
398,027  9/1933  Great Britain........... 352/5
741,373  11/1944  Germany................ 352/5
138,473  8/1934  Austria................. 352/5

Primary Examiner—Samuel S. Matthews
Assistant Examiner—Russell E. Adams, Jr.
Attorney—Leonard H. King

[57] ABSTRACT

An exposure sheet that is used in preparing animated motion pictures is provided with a recording medium, such as a strip of magnetic tape, extending along the length thereof. The exposure sheet is subdivided into horizontal sections that coincide in position with frames on a master sound track. Sprocket holes are provided in the exposure sheet to insure synchronization with the master sound track, when the signals are transferred from the master sound track to the recording medium on the exposure sheet. A stylus, responsive to the audio signals on the master sound track, may be used to apply a visual indication or display of the audio signal on the master sound track on to the exposure sheet. The present invention contemplates that the exposure sheet will be either in continous, reel form or in strips that are cut to different lengths and which coincide with the different lengths of the various scenes. Alternatively, the exposure sheets may be cut in equal lengths that are secured together and are adapted to be used in table form. In use, a transducer, such as a pick-up head, may be moved over the magnetic tape on the exposure sheet in order to evaluate individual frames on the master sound track. At the same time various overlays, each representing a portion of the total animation, may be manually flipped in order to provide an indication of the synchronization.

15 Claims, 12 Drawing Figures

3,767,296

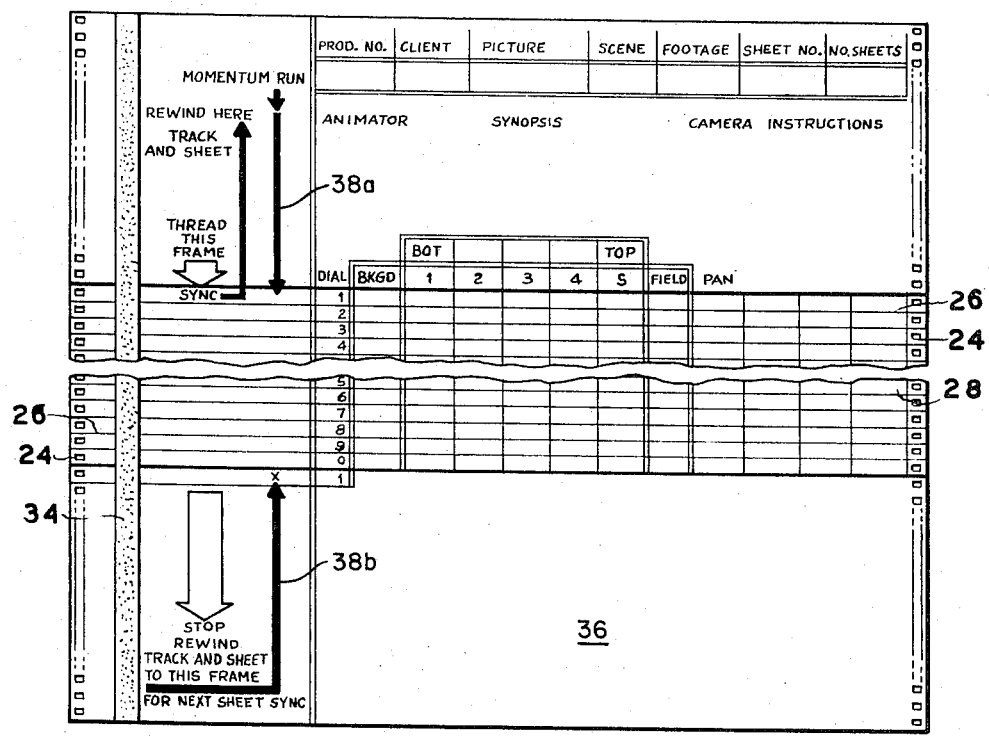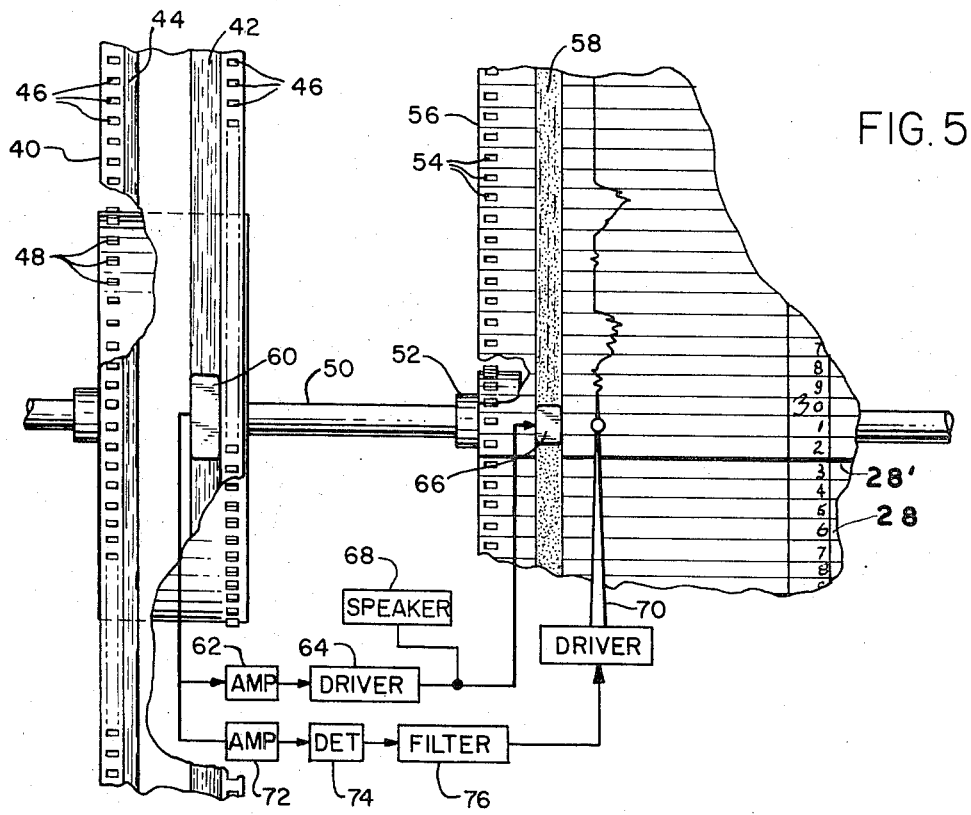

APPARATUS FOR MAKING ANIMATED MOTION PICTURES OR THE LIKE

BACKGROUND OF THE INVENTION

1. Field of the Invention

This invention relates generally to sound synchronized motion pictures and, more particularly, to an improved exposure sheet such as used, for example, in the preparation of sound synchronized, animated motion pictures as well as the method for using the improved exposure sheet.

2. Description of the Prior Art

In order to synchronize the audio and visual effects of animated motion pictures, such as cartoons, for example, it is necessary to examine the entire, prerecorded sound track and then carefully coordinate the different sounds thereon with specific pieces of art work. At present, the sound track is either on a disc or a very long length of tape. It will be readily apparent that, at best, it is a slow, painstaking and laborious task to first find and then transfer, to an exposure sheet, the arrangement of sound effects, musical beat, narration and/or dialogue by means of appropriate symbols representing the various sounds. The execution of this task depends almost completely upon the experience and skill of the operator. However, for any one of a number of reasons, the highs and lows and accents that are found throughout the sound track in many instances are not inscribed on the exposure sheet by the person reading the master sound track. It then becomes necessary for the person doing the animation to listen to the recorded sound track for further evaluation. Either a sound movieola, a tape recorder, a record player or other means are used for this purpose. To locate a specific portion in the sound track relative to the section or scene that is to be animated is extremely time consuming, since the sound track and the exposure sheet are separate elements. Accordingly, it is a very difficult task to analyze a sound track and time the animated action, particularly where dialogue is used and the lip movement of the figures in animation must be synchronized therewith.

SUMMARY OF THE INVENTION

In its broadest aspect, the present invention provides an exposure sheet having a recording medium, for example, a strip of magnetic tape, integral therewith and means for physically aligning the exposure sheet relative to a master sound track. Preferably, means such as sprocket holes are provided for moving the exposure sheet and the master sound track in synchronism. Means are also provided for transferring the signals from the sound track to the recording medium on the exposure sheet which includes discrete writing areas or separate frames that are coincidental with specific frames on the master sound track.

The exposure sheet may be a continuous length that is stored on a reel for ease of editing or it may be cut into individual sections, the lengths of which would depend on the given scenes. Alternatively, the exposure sheets may be cut to substantially identical lengths and then used together in tablet form.

The scope of the present invention also includes means for examining the recording medium on the exposure sheet by moving a transducer, such as a pick-up head, thereover. Thus, the sound associated with individual frames on the exposure sheet can be readily evaluated and the needed information can be written on the exposure sheet in the appropriate area. When the signals on the master sound track are physically recorded in proper synchronization on the exposure sheet, the animator will then move a combined audio and visual indication of the sound track. With the present invention, an animator may move a pick-up head over the magnetic tape on the exposure sheet and simultaneously flip the animated drawings to provide an instantaneous analysis and evaluation of the sound and action. When necessary, the sprocket holes in the exposure sheet may be strengthened by the application of a varnish base solution. This is particularly useful when thin or weak paper is used.

Accordingly, it is an object of the present invention to provide audio and visual indications of a master sound track on an exposure sheet that is used in preparing animated motion pictures.

Another object of the present invention is to provide a recording medium, such as a magnetic tape, on an exposure sheet whereby the signals of a master sound track may be transferred thereto and thereby permit simultaneous analysis of the sound and timing of the animated action to the frame on the exposure sheet.

Still another object of the present invention is to provide an exposure sheet that is perforated with standard motion picture sprocket holes along both longitudinal edges thereof whereby the linear movement of the exposure sheet may be synchronized with the linear movement of a master sound track.

A further object of the present invention is to provide means for applying a graphic indication of the master sound track on the exposure sheet, adjacent the recording medium thereon.

It is a specific object of the present invention to provide an exposure sheet for use in the preparation of animated motion pictures wherein the exposure sheet is provided with its own sound track for the reception of audio signals from a master sound track with the sound track and specific areas on the exposure sheet being in a definite predetermined relationship to each other.

An additional object of the present invention is to provide means for an animator to examine the exposure sheet sound track described hereinabove by moving a pick-up head back and forth over the recording medium and thereby indicate to the animator or the exact frame in which the audio signal is occurring on the exposure sheet, the audio signal being thereby evaluated and the necessary information written in frame-by-frame on the exposure sheet.

An additional object is to provide an improved exposure sheet, as described above, that is cut to different lengths that are substantially equal to the length of the individual scenes.

Another object of the present invention is to provide an improved exposure sheet, as described above, that is in continuous form for storage on a reel.

An additional object of the present invention is to provide an improved exposure sheet, as described above, wherein the exposure sheets are cut in equal lengths and secured together for use as a tablet.

Still another object of the present invention is to provide means for analyzing and evaluating the coordination of the sound and action, the means being a pick-up head adapted to be moved along and over the magnetic tape on the exposure sheet while the animated drawings are flipped.

These and other objects, features and advantages of the present invention will, in part, be pointed out with particularity, and will, in part, become obvious from the following more detailed description of the invention, taken in conjunction with the accompanying drawing, which forms an integral part thereof.

BRIEF DESCRIPTION OF THE DRAWING

In the various figures of the drawing, like reference characters designate like parts. In the drawing:

FIG. 4 is a plan view illustrating an alternative embodiment of the exposure sheet comprising the present invention;

FIG. 5 is a fragmentary, plan view, partially schematic, illustrating the means used for the transfer of audio signals from a master sound track to the exposure sheet comprising the present invention;

DESCRIPTION OF THE PREFERRED EMBODIMENT

Figure 1:
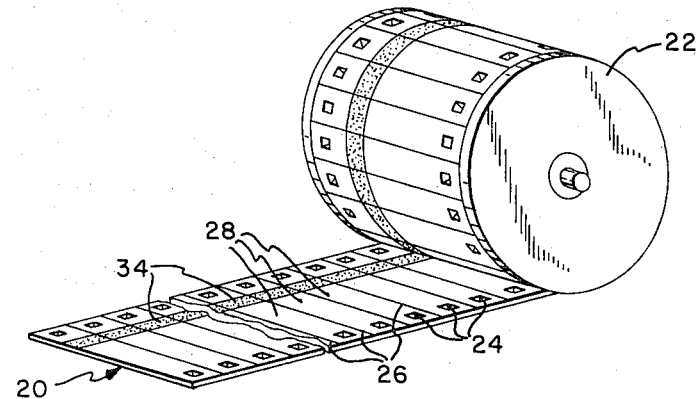
FIG. 1 is a perspective view of one form of the exposure sheet comprising the present invention.

Referring now to the drawing, there is shown in FIGS. 1-4 several forms of the present invention. For example, in FIG. 1, the exposure sheet 20 is comprised of a continuous length of paper that is wound on a reel 22 for storage purposes. The lateral side edges of the strip 20 are provided with a plurality of equally spaced movie film sprocket holes 24. A plurality of transverse lines 26 define discrete writing areas 28 therebetween. As will be brought out more fully hereinafter, there is provided one pair of sprocket holes 24 for each space 28 with the spaces 28 being located between adjacent sprocket holes 24. Therefore, the center to center dimension between the spaces 28 coincide with the spacing between every four sprocket holes on the master sound track (FIG. 5). For 35 mm a 4:1 ratio is employed. While 35 mm master tape has been employed herein for purposes of illustration other film sizes may be employed. Thus, for 16 mm, 8 mm, etc., for each frame of film there would be provided one space on the exposure sheet. Each space 28 is equivalent to one frame on the master sound track.

Figure 2:
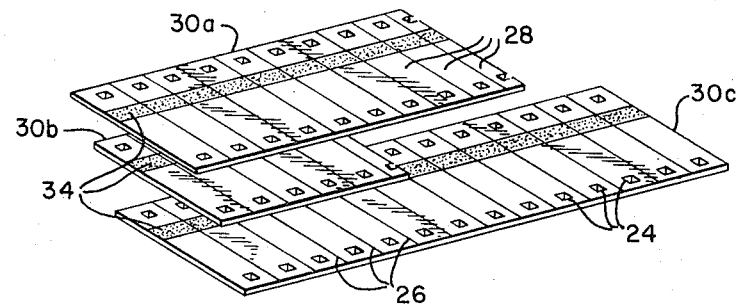
FIG. 2 is an exploded, perspective view illustrating another form of the exposure sheet comprising the present invention.

In FIG. 2, the exposure sheets 30a, 30b, 30c, etc., are cut to different lengths that coincide with the lengths of respective scenes that are to be animated. As in the FIG. 1 embodiment, each of the sheets 30 is provided with a plurality of sprocket holes 24 along the lateral edges thereof, as well as transverse lines 26 that define spaces 28 therebetween.

Figure 3:
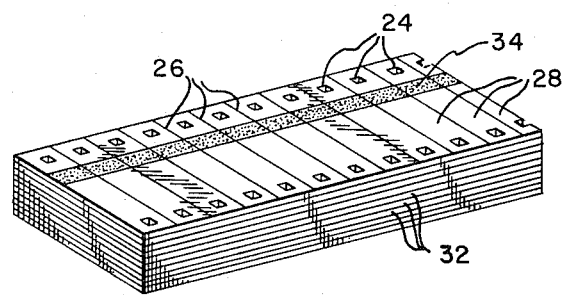
FIG. 3 is a perspective view illustrating still another form of the exposure sheet comprising the present invention.

The FIG. 3 embodiment illustrates a plurality of exposure sheets 32, each of which is provided with a plurality of sprocket holes 24 along the lateral edges thereof as well as a plurality of the transverse lines 26 that define the spaces 28. However, in the FIG. 3 embodiment, all of the sheets 32 are cut to the same length so that a group of the sheets 32 may be used in tablet form.

In each of the first three embodiments just described, a length of magnetic tape 34 is adhered to the surface of the sheets parallel to the line of sprocket holes 24 and adjacent one longitudinal edge.

The FIG. 4 embodiment illustrates still another alternative form of the present invention. In FIG. 4 the exposure sheet 36, in addition to having the two laterally spaced rows of sprocket holes 24 along the edges thereof, the transverse lines 26 defining the transverse spaces 28 and the strip of magnetic tape 34, is provided with additional horizontal and vertical lines defining spaces in which other information may be recorded. It will be noted, for example, that one vertical column is numbered from 1 through 9 and then 0. The animator then marks in the appropriate tens or hundreds digit. This pattern is repeated successively and is separated only by heavy, black, horizontal lines 28', more clearly shown in FIG. 5. Each of the sixteen horizontal spaces 28 in FIG. 4 correspond to the sixteen frames found in each one foot length of the 35 mm master sound track. Thus each 80 space sheet corresponds to 5 feet of film. The lines 28' permit the animator to quickly count the number of feet involved. The exposure sheet 36 shown in FIG. 4 further includes a number of headings that permit the operator to make appropriate indications of the various pieces of art work that are to be used with a specific frame. The exposure sheet 36 further includes areas for indicating camera instructions and movement of the background. The foregoing is conventional and is well known in the art. A heavy black line 38a is provided at the upper end of the sheet 36 in order to provide a starting point from which the apparatus is initially turned on. The finite length represented by line 38a permits the apparatus to come up to the correct running speed before the first frame is reached. At the lower end of the sheet 36 there is also provided a heavy black line designated by the reference character 38b. The finite length of the sound track parallel to lines 38a, 38b provides, in effect, an overrun which is useful should the sound be in the middle of a vowel or word or the like.

Referring now to FIG. 5, thee is shown one practical application of the present invention wherein an exposure sheet such as the type shown for example in FIG. 4 is utilized. It should be understood, however, that the exposure sheets shown in FIGS. 1, 2 or 3 may also be used. A recording medium, such as film 40, is provided with a master sound track 42 and 44. Proximate the lateral edges of the recording medium 40, there are provided a plurality of sprocket holes 46 whose size and spacing are standard in the movie industry. A drive sprocket 48 is supported for rotation by a motor (not shown) to thereby drive the recording medium 40. A shaft 50 connects the sprocket 48 to a pair of driven sprockets 52 that are laterally spaced apart by a dimension equal to the spacing between the sprocket holes 54 that are formed in the lateral side edges of an exposure sheet 56. For convenience, only one row of sprocket holes 54 are shown in FIG. 5. The exposure sheet 56 is also provided with a length of magnetic tape 58.

The recorded sounds on the master sound track 42 are read by a pick-up head 60 and the electrical signals are transferred to the tape 58 through an amplifier 62, a driver 64, and a recording head 66. A speaker 68, placed in parallel along the path, makes the sound audible to the user. The electrical signals from the pick-up head 60 are also used to actuate a recording pin or stylus 70 through an amplifier 72, a detector 74, a filter 76, and a driver 78 whereby the amplitude of the plotted signal is a function of the amplitude of the recorded sound.

Figure 6:
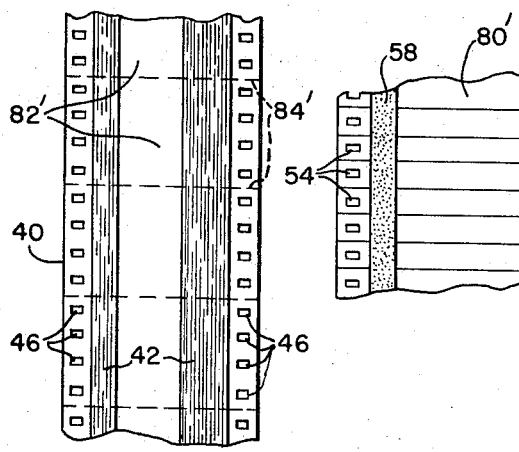
FIG. 6 is a fragmentary, plan view illustrating the physical relationship of the master sound track and the exposure sheet comprising this invention.

The physical relationship between the master sound track recording medium 40 and the exposure sheet 56 is more clearly shown in FIG. 6. It will be noted that there is provided one horizontal space 80' for each sprocket hole 54 in the exposure sheet 56 and each of the spaces 80' is equivalent to a single frame 82' that is schematically defined by the spacedly parallel, horizontal dashed lines 84' shown on the master sound track recording medium 40. However, it will be noted that there are four sprocket holes 46 for each frame 82. Thus, in order to have the master sound track 42 and the exposure sheet 56 driven linearly at the same speed, the sprocket 48 has a diameter that is four times larger than the sprockets 52. Since the sprockets 48 and 52 are mounted on the same shaft 50 and are driven by the same motor (not shown), the lineal speed of the master sound track 42 and the exposure sheet 56 may be very closely matched. Alternatively, a gear train can be used to achieve the desired ratio.

Figure 7:
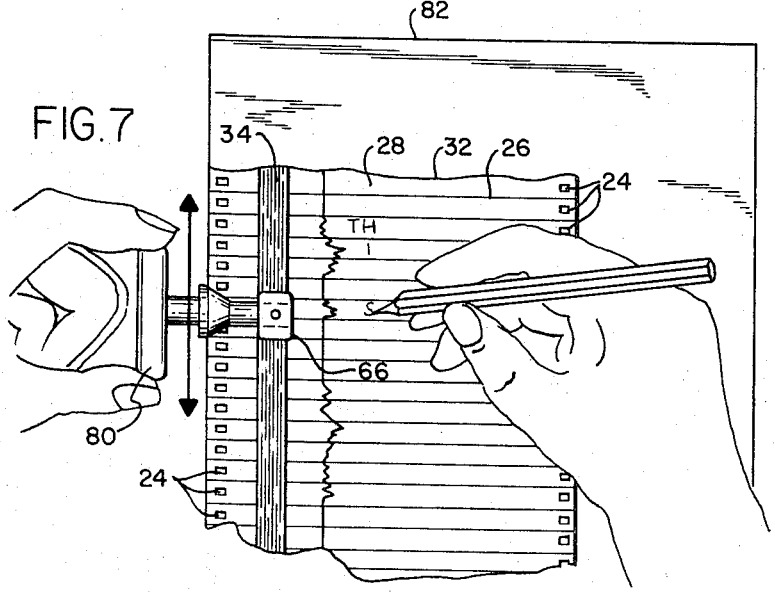
FIG. 7 is a fragmentary, plan view illustrating the manner in which the present invention is used.

Once the sound track has been transcribed on to the exposure sheet, for example, exposure sheet 32 shown in FIG. 3, the person reading the track may, using the speaker 68, translate the sound track written by the stylus 70 into readable characters. As is well known, different words or letters will have different recorded amplitudes as shown, for example, in FIG. 7 by the letters "TH", "I" and "S".

Figure 8:
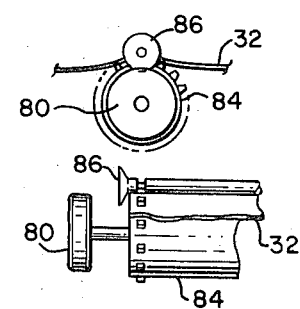
FIG. 8 is a fragmentary, side elevational view illustrating the drive means used with the present invention.

As shown in FIG. 8 with the pick-up head 66 held in a fixed position over the sound track 34, a knob 80 is rotated so as to drive the exposure sheet 32 past the pick-up head 66. A board 82 is used to support the exposure sheet 32 and a sprocket 84 that is mounted coaxially with the knob 80 is used in cooperation with a roller 86 to advance the exposure sheet 32. In this manner, the entire sound track recorded on the exposure sheet may be evaluated.

Figure 9:
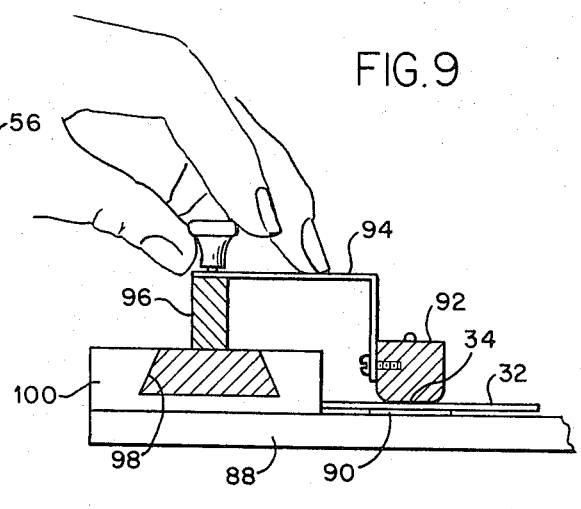
FIG. 9 is an elevational view, partially in section, illustrating another form of usage of the present invention.
Figure 10:
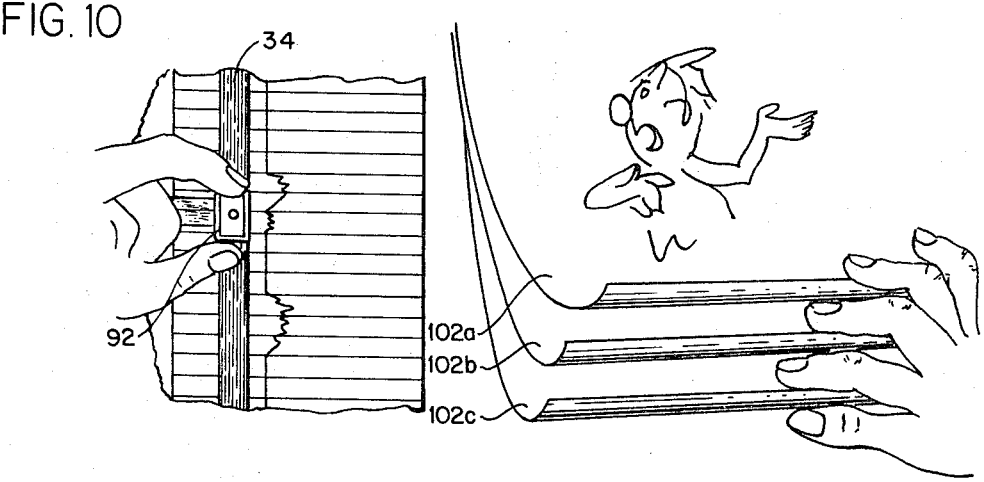
FIG. 10 is a fragmentary, plan view, illustrating still another mode of usage of the present invention.

In order to selectively listen to various portions of the exposure sheet, the apparatus shown in FIG. 9 may be used. The exposure sheet 32 is fixedly mounted on a support board 88 on which is provided a felt pad 90 and over which is positioned the magnetic tape 34. A pick-up head 92 that is connected to either earphones or a speaker (not shown) is supported on a bracket 94 that is integral with a slide member 96. A dovetail groove 98 formed in an enlarged portion 100 of the support board 88 permits the pick-up head 92 to be moved back and forth along the recording medium 34 so that the signals thereon may be listened to repetitively. As shown in FIG. 10, for example, a plurality of animated overlays designated by the reference characters 102a, 102b and 102c may be flipped while listening to the sounds. This may be done concurrently with moving the pick-up head 92 longitudinally along the sound track 34.

Figure 11:
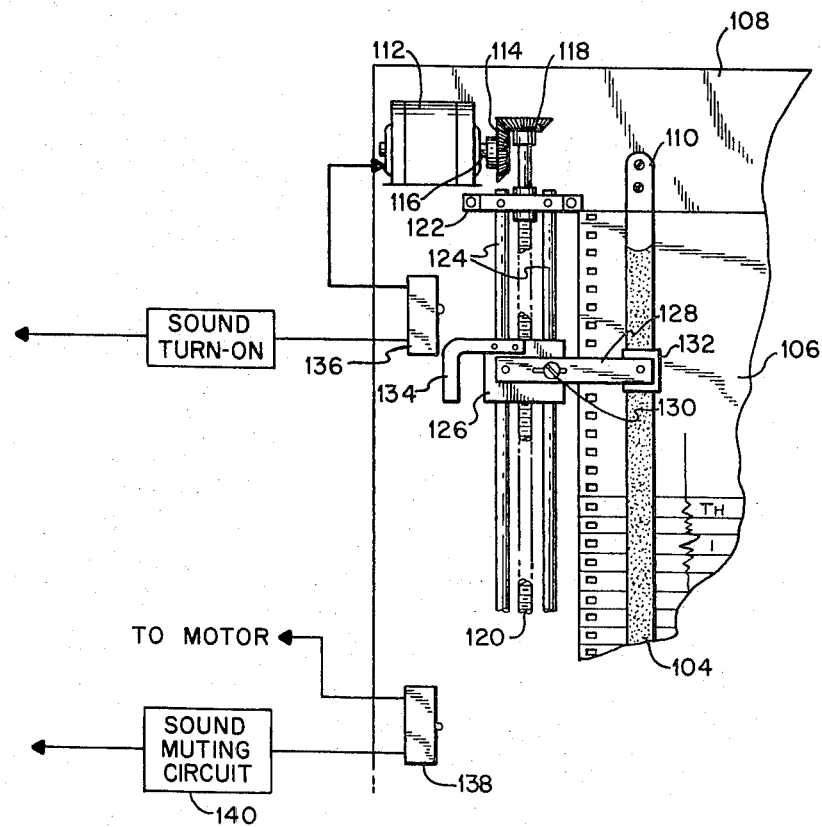
FIG. 11 is a schematic plan view illustrating automatic means for "reading" the exposure sheet comprising this invention.

Referring now to FIG. 11, there is shown mechanical means for "reading" a magnetic tape 104 that is integral with an exposure sheet 106. A plastic board 108 has mounted thereon spring clip means 110 for removably securing the sheet 106 thereto. A reversible, high speed drive motor 112 is provided with a bevel gear 114 on the output shaft 116 thereof. The bevel gear 114 meshingly engages a second bevel gear 118 that is rigidly secured to an elongated threaded rod 120. A pair of blocks 122 (only one of which is shown) are spaced apart from each other and journal the shaft 120 proximate the ends thereof. Parallel spaced apart rods 124 are also secured in the blocks 122. A traveling, internally threaded nut 126 is slidably mounted on the rods 124 so as to move axially when the threaded rod 120 is rotated by means of the motor 112 and the bevel gears 114 and 118. A flat leaf spring 128 is adjustably mounted on the block 126 by means of a knob 130. The spring, at its outer end, supports a pick-up head 132 for movement over the sound track 104. A control arm 134 is also mounted on the block and is arranged to engage a switch 136 that is electrically connected to the motor 112. The switch 136 is used to turn the sound on when the switch 136 is engaged by the arm 134. A second switch 138 that is remote from the switch 136 is also electrically connected to the motor 112 as well as to a sound muting circuit 140. When the second switch 138 is engaged by the control arm 134, the direction of travel of the pick-up head will be reversed. Preferably the reverse travel of the pick-up head 132 will be at a higher speed than its initial travel over the recorded sound track 104. It should be appreciated that other conventional mechanical and electrical circuits may be incorporated to move the pick-up head.

Figure 12:
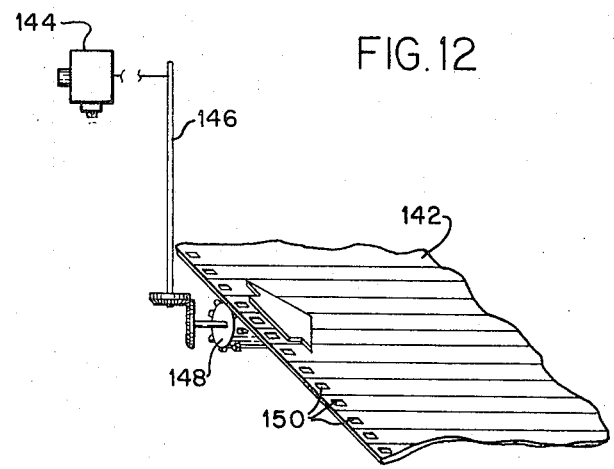
FIG. 12 is a schematic perspective view illustrating means for attaching the present invention to a camera.

FIG. 12 illustrates means for synchronizing an exposure sheet 142 to the shutter mechanism of a remote camera 144 that is used to photograph the animation. Linkage means generally designated by the reference character 146 is coupled to a drive sprocket 148 that is in engagement with the sprocket holes 150 positioned on the lateral side edges of the exposure sheet 142. Thus, every time the camera shoots a frame, the exposure sheet 142 will be advanced to the next frame and will thereby be in synchronism with the camera action. Should the camera man stop for any reason, he will be assured that the exposure sheet 142 is always in synchronism with the camera 144.

In FIG. 4 there has been disclosed an audio graphic exposure sheet with a particular number of columns. The number of columns can be varied to meet the needs of the particular studio or type of work. The columnless sheet shown in FIGS. 1 an 2 may be affixed to the exposure sheet of FIG. 4. This is useful when sound is added to a portion of the film after the initial sound track is made.

There has been disclosed heretofore the best embodiment of the invention presently contemplated. However, it is to be understood that various changes and modifications may be made thereto without departing from the spirit of the invention.

We claim:

1. Apparatus for making a visual/audiographic script for animated motion pictures or the like from a prerecorded master sound track, said apparatus comprising;
   a. an elongated exposure sheet having a plurality of areas for recording indicia thereon, said areas being defined by a plurality of lines running transverse the length of said exposure sheet, said areas having a predetermined, spatial relationship to the frames of the film on which the animated motion picture will be photographed;
   b. a length of magnetic recording medium secured to said exposure sheet, said recording medium extending substantially parallel to the length thereof and in juxtaposition to said areas, said recording medium having the sound for the animated motion picture rerecorded there from the master sound track;
   c. means for transferring a graphic illustration of the audio signals from the master sound track to said exposure sheet along side of and substantially parallel to said recording medium said graphic illustration being in synchronism with the dialogue on said recording medium; and
   d. a line of sprocket holes formed in said exposure sheet adjacent and parallel to each longitudinal edge thereof for linearly advancing said exposure sheet.

2. The apparatus in accordance with claim 1 wherein said exposure sheet is in a continuous length.

3. The apparatus in accordance with claim 1 wherein said exposure sheet is cut to a specific length.

4. The apparatus in accordance with claim 3 wherein there are a plurality of said exposure sheets, at least some of which are different lengths.

5. The apparatus in accordance with claim 3 wherein there are a plurality of said exposure sheets, all of which are substantially the same length.

6. The apparatus in accordance with claim 1 wherein, said transfer means comprising a pick-up head adapted to scan the master sound track, a recording head adapted to scan said length of magnetic tape on said exposure sheet, and circuit means for electrically connecting said pick-up head and said recording head.

7. The apparatus in accordance with claim 6 wherein said circuit means comprises a speaker coupled to said pick-up head for producing an audio signal.

8. The apparatus in accordance with claim 6 wherein said circuit means includes a stylus coupled to said pick-up head, said stylus being arranged to provide a visual indication on said exposure sheet of the signals on said master sound track.

9. The apparatus in accordance with claim 6 wherein there is further included means for drivingly coupling said master sound track and said exposure sheet.

10. The apparatus in accordance with claim 9 wherein said coupling means comprises a driven shaft, first sprocket means on said shaft for engaging said sprocket holes to said master sound track and second sprocket means on said shaft for engaging said sprocket holes on said exposure sheet.

11. The apparatus in accordance with claim 10 wherein the number of teeth on said first sprocket means and said second sprocket means are different.

12. The apparatus in accordance with claim 6 wherein means are included for holding said pick-up head in a fixed position and means are also provided for moving said exposure sheet past said pick-up head.

13. The apparatus in accordance with claim 6 wherein actuating means are included for moving said pick-up head over said exposure sheet along the length of said magnetic tape.

14. The apparatus in accordance with claim 13 wherein said actuating means comprises a drive motor, a threaded rod rotated by said drive motor, a nut movable along the length of said rod and means secured to said nut for supporting said pick-up head.

15. The apparatus in accordance with claim 13 wherein said actuating means comprises a board for supporting said exposure sheet, a track formed in said board, a slide member movable in said track and means secured to said slide member for supporting said pick-up head.

* * * * *

UNITED STATES PATENT OFFICE
CERTIFICATE OF CORRECTION

Patent No. 3,767,298          Dated   October 23, 1973

Inventor(s) Rufle et al.

It is certified that error appears in the above-identified patent and that said Letters Patent are hereby corrected as shown below:

Column 2, line 5 for "move" substitute --have--

Signed and sealed this 1st day of October 1974.

(SEAL)
Attest:

McCOY M. GIBSON JR.          C. MARSHALL DANN
Attesting Officer            Commissioner of Patents